April 28, 1936.  J. R. JONES  2,038,843
THREE WHEELED AUTOMOBILE
Filed Nov. 21, 1934  2 Sheets-Sheet 1
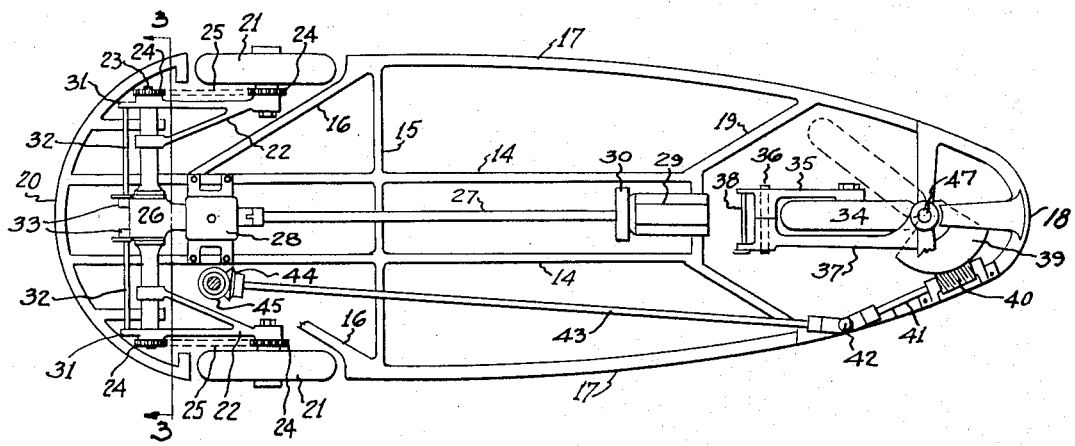
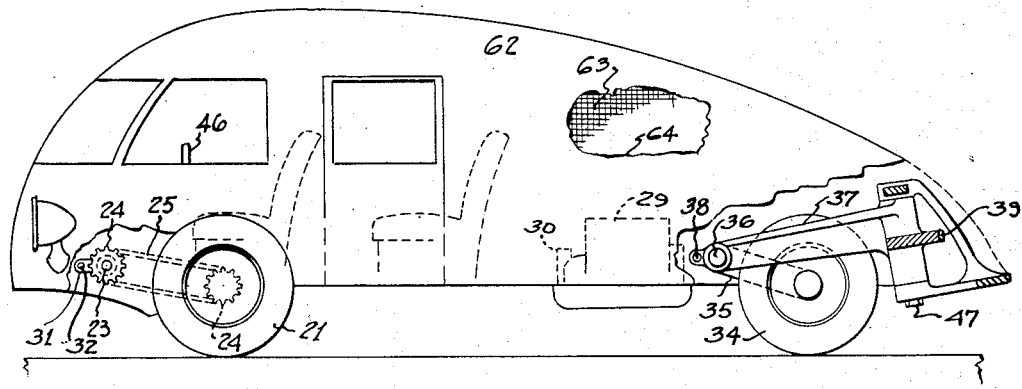
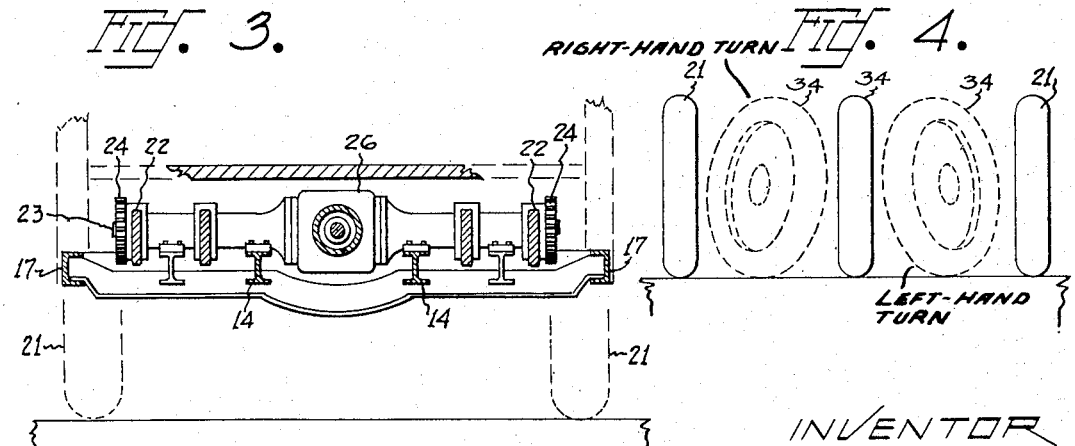
INVENTOR
J. R. JONES
BY
ATTORNEY April 28, 1936.  J. R. JONES  2,038,843
THREE WHEELED AUTOMOBILE
Filed Nov. 21, 1934  2 Sheets-Sheet 2
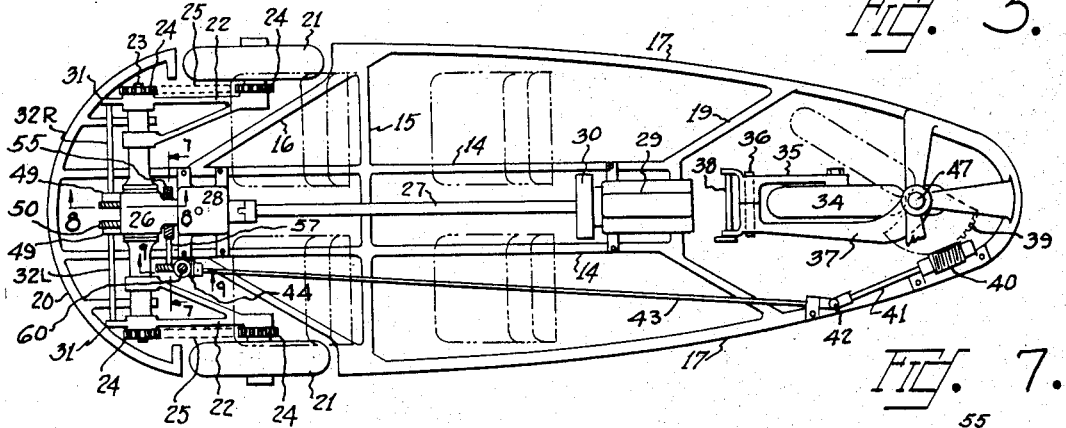
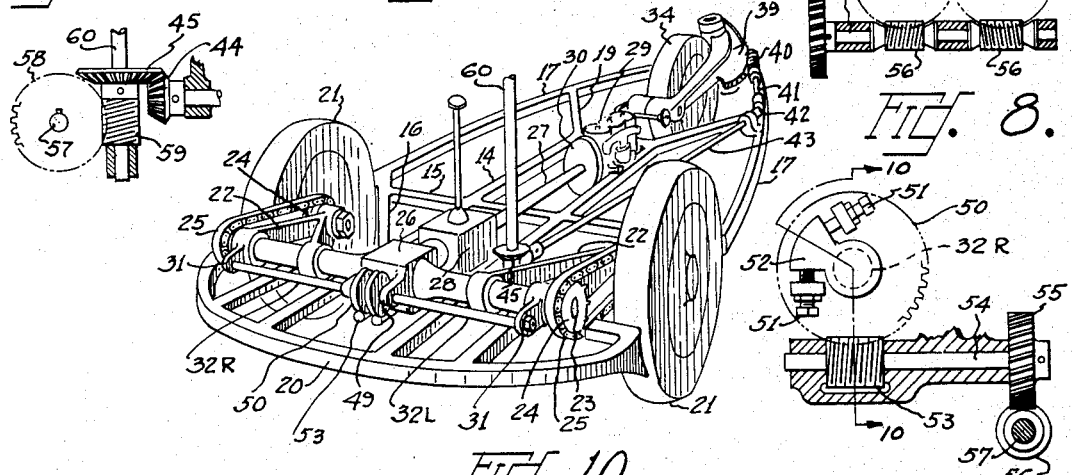
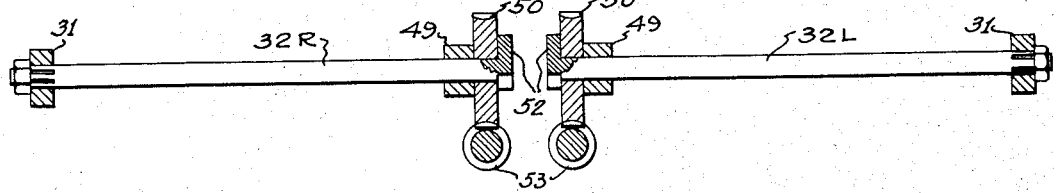
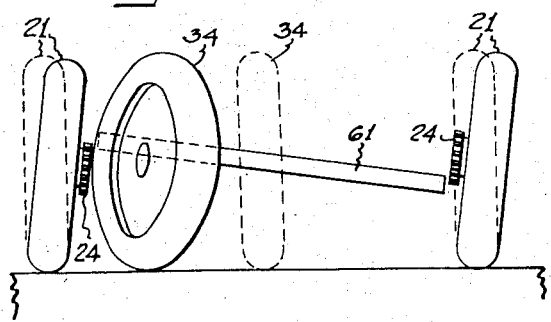
INVENTOR
J. R. JONES
BY
ATTORNEY Patented Apr. 28, 1936

2,038,843

UNITED STATES PATENT OFFICE 2,038,843

THREE WHEELED AUTOMOBILE

Joseph R. Jones, Portland, Oreg.

Application November 21, 1934,
Serial No. 754,039½

6 Claims. (Cl. 180—27)

This invention relates generally to automobiles, and particularly to a three wheeled automobile having two driving wheels in front and one steerable wheel behind.

The main object of this invention is to increase the stability of a three wheeled automobile.

The second object is to so position the steering wheel that it will best be able to withstand the strains imposed thereon and that lateral stresses will be reduced to a minimum.

The third object is the provision of an improved form of knee action arm which extends backwardly thereby pulling the wheel over the object instead of pushing same.

The fourth object is employment of a torsion bar for the purpose of keeping the arm upon which the wheel is suspended properly sprung.

The fifth object is to construct an automobile in which the chassis serves as a platform on which the vital parts of the car are mounted.

The sixth object is to so construct an automobile that the body need carry no equipment other than the lamps.

The seventh object is to provide an automobile with a front wheel drive having the same action as does the steering wheel.

The eighth object is to construct the automobile of light weight steel tubing or structural shapes covered with a wire mesh, over which is applied fire proof plastic wood.

The ninth object is to construct an automobile in which all the wheels are independently sprung.

The tenth object is to construct a form of automobile in which all of the wheels will incline away from the outside track on curves and in which the center of gravity of the automobile will be shifted automatically on curves to enable the car to better resist centrifugal action.

These, and other objects, will become more apparent from the specification following as illustrated in the accompanying drawings, in which:

Fig. 1 is a plan of the automobile with the body removed.

Fig. 2 is a side elevation of the body with parts broken away in section.

Fig. 3 is a vertical section taken along the line 3—3 in Fig. 1.

Fig. 4 is a diagrammatic view showing the position of all the wheels for straight line driving in full lines, and the positions assumed by the steering wheel on right and left hand turns in dotted lines.

Fig. 5 is a plan of the modified form of the device in which the two front wheels, which are the driving wheels, automatically incline away from the outside curve.

Fig. 6 is a perspective view of the modification shown in Fig. 5.

Fig. 7 is a section taken along the line 7—7 in Fig. 5.

Fig. 8 is a section taken along the line 8—8 in Fig. 5.

Fig. 9 is a section taken along the line 9—9 in Fig. 5.

Fig. 10 is a section taken along the line 10—10 in Fig. 8.

Fig. 11 illustrates how the front drive wheels incline away from the outside track while the rear steering wheel is moved toward, but inclines away from, the outside track.

Similar numbers of reference refer to similar parts throughout the several views.

Referring first to the form of the device shown in Figs. 1 to 4, it will be seen that the chassis consists of a pair of longitudinal members 14 and the transverse member 15, which intersects the longitudinal members 14. The diagonal members 16 connect the outermost ends of the transverse member 15 and the members 14 in front of the member 15. Curved side members 17 extend from the outermost ends of the transverse member 15 to the rounded end 18. The diagonal braces 19 connect the rearmost ends of the members 14 with the side members 17.

The rounded front 20 extends backwardly toward the front wheel members 21. Each wheel member 21 is mounted on a hinged arm 22, which is mounted on the axis of the drive shaft 23 and is driven therefrom through the sprockets 24 and the chain 25. The shaft 23 is driven through the differential 26 from the propeller shaft 27 through a gear box 28. Any suitable type of motor 29 and fly wheel 30 may be employed. Each arm 22 is provided with a forwardly extending lug 31 to which is secured the torsion bar 32, whose inner end is secured to a bracket 33 on the differential 26.

Referring now to the rear wheel 34 which does the steering, it will be seen that same is mounted on a rearwardly extending arm 35, which is pivotally connected by means of a pin 36 to a forwardly extending arm 37 and is sprung therefrom by means of a torsion bar 38. The steering segment 39 is fixed to the arm 37 and meshes with a steering worm 40, whose shaft 41 is connected by means of a universal coupling 42 to the shaft 43, which through the bevel gears 44 and 45 receives motion from the steering wheel 46, which is preferably in an upright position.

The arm 37 is mounted on the upright steering spindle 47.

In the operation of this form of the automobile, it will be seen in Figs. 1 to 4 that a movement of the rear wheel 34 to effect a left turn will require that the wheel 34 be moved to the right, which is made possible by reason of the fact that the axle of the wheel 34 is in front of the steering spindle 47, thereby giving the vehicle the maximum amount of stability on curves and supporting it on the outer side where the support is most required. It will be noted in Fig. 4 that not only is the wheel 34 moved toward the outside track when taking a curve, but is also inclined so that the top of the wheel is inclined away from the outside track, thereby subjecting the wheel spokes to tension only instead of subjecting same to bending strains as is ordinarily the case when an automobile takes a curve at high speed. This inclusion is due to the slope of the spindle 47.

Another advantage arising from this construction is the fact that tires are less apt to be torn from the rims, since the thrust is more nearly in the plane of the wheel instead of normal thereto.

In the form of the device shown in Figs. 5 to 11, the steering wheel arrangement is precisely the same as previously described. Each torsion bar 32R and 32L is rotatable in the journal 49 and has mounted on its inner end a worm wheel 50, which is adjustable with relation to the bars 32R or 32L by means of the set screws 51 which bear against the lug 52, which is secured on the bars 32R and 32L. Each worm wheel 50 meshes with a worm 53 on the shaft 54 on whose rearward end is mounted a worm wheel 55, which in turn meshes with a worm 56 on the shaft 57.

It will be seen in Fig. 7 that the shaft 57 has two worms 56 mounted thereon and that these are right and left handed. On the outer end of the shaft 57 is the worm wheel 58 which meshes with a worm 59 on the steering shaft 60, to which is also secured the bevel gear 45 through which motion is transmitted through the bevel gear 44 to the rear wheel 34. The remainder of the parts are identical with those described in Figs. 1 to 4, except that the position of the floor 61 is indicated in Fig. 11.

In this form of the device all of the wheels occupy vertical planes when set for straight line travel. When for example, as shown in Fig. 11, a right hand turn is to be made, the wheels 21 and 34, which are shown in dotted lines for straight line travel, will assume the position shown in full lines—that is, the rear wheel 34 will move to the left to effect a right hand turn and the top of each wheel 21 will lean to the right. It will also be noted that the floor 61 rises on the left hand side and lowers on the right hand side. This is accomplished automatically since the rotation of the steering wheel 46 and the consequent rotation of the steering shaft 60 will bring about a slight rotation of the worm wheels 50, which determine the relative torsion on the bars 32L and 32R so that when the steering wheel 46 is turned to produce a right hand turn, as shown in Fig. 11, the torsion on the right hand bar 32R will be decreased, and the torsion on the left hand bar 32L will be increased. It can be seen, for example, that any variation in the initial torsion of the bar 32R will affect the normal position of the corresponding arm 22—that is, move it upwardly or downwardly with relation to the floor of the car and since the bars 32R and 32L are interconnected and that the worms 56 are right and left handed, then the bars 32L and 32R move in opposite directions producing a lifting action on one side of the automobile and a lowering action on the other as a direct result of a rotation of the shaft 43, which is part of the steering mechanism.

It can be seen from the foregoing that the automobile which I have described will not only be inexpensive to manufacture and simple to operate, but will possess extremely desirable riding qualities due to the fact that each of the wheels is independently sprung, and that the body of the car itself will be adjusted to compensate against the feeling produced by centrifugal action as the car is passing around curves.

It is desirable to construct the body 62 of suitable structural shapes covered with a metallic webbing 63 and then to cover the webbing with a fire proof plastic material 64, which is then appropriately finished.

I am aware that numerous forms of three wheeled automobiles have been constructed in the past. It is therefore not my intention to cover this device broadly, but I intend to cover all such forms and modifications therefor that fall fairly within the appended claims.

I claim:

1. A three wheeled automobile having a pair of driving wheels in front and a steerable wheel behind, said steerable wheel being mounted on a rearwardly extending arm whose forward end is hinged to a forwardly extending arm, the rear end of said forwardly extending arm being supported by a steering spindle.

2. The automobile as described in claim 1 characterized by having independent spring mountings for each of the three wheels.

3. An automobile of the class described having two front drive wheels and one steerable rear wheel, said steerable rear wheel being mounted on the rear end of a wheel arm whose forward end is connected to the forward end of a steering arm, said steering arm having a substantially upright spindle at its rearmost end thereof, and a torsion bar between said wheel arm and steering arm together with means connected with the steering wheel of the automobile for swinging said steering arm.

4. The automobile described in claim 3 in which each of the drive wheels is mounted on a spring urged arm extending rearwardly from the drive axle of the automobile.

5. A three wheeled automobile having a single steerable wheel at the rear end thereof, a pair of drive wheels at the forward end thereof, torsion bars for independently springing each of said drive wheels, a steering mechanism for actuating said steerable wheel and means operable from said steering mechanism for varying the relative torsion of said torsion bars whereby it will be decreased on the side toward which the turn is made and increased on the opposite side thereof.

6. An automobile of the class described having a chassis including supporting springs therefor, a single steerable rear wheel, a pair of front drive wheels and a steering mechanism for said steerable wheel including steering mechanism adapted to increase the spring load on the outer driving wheel and decreasing it on the inner driving wheel during the making of a turn and at the same time inclining said drive wheels away from the outside of the curve being traveled.

JOSEPH R. JONES.